(12) United States Patent
Lasperas et al.

(10) Patent No.: US 10,019,382 B2
(45) Date of Patent: Jul. 10, 2018

(54) SECONDARY DATA STRUCTURES FOR STORAGE CLASS MEMORY (SCM) ENABLES MAIN-MEMORY DATABASES

(71) Applicant: SAP SE, Walldorf (DE)

(72) Inventors: Johan Lasperas, Heidelberg (DE); Ismail Oukid, Mannheim (DE); Anisoara Nica, Waterloo (CA)

(73) Assignee: SAP SE, Walldorf (DE)

(*) Notice: Subject to any disclaimer, the term of this patent is extended or adjusted under 35 U.S.C. 154(b) by 164 days.

(21) Appl. No.: 14/887,578

(22) Filed: Oct. 20, 2015

(65) Prior Publication Data
US 2017/0109295 A1 Apr. 20, 2017

(51) Int. Cl.
G06F 12/14 (2006.01)
H04L 29/06 (2006.01)
G06F 17/30 (2006.01)

(52) U.S. Cl.
CPC .... *G06F 12/1408* (2013.01); *G06F 17/30949* (2013.01); *H04L 63/061* (2013.01); *H04L 63/0876* (2013.01); *G06F 2212/1052* (2013.01)

(58) Field of Classification Search
CPC .......... G06F 12/1408; G06F 12/30949; G06F 2212/1052; H04L 63/0876; H04L 63/061
See application file for complete search history.

(56) References Cited

U.S. PATENT DOCUMENTS

2010/0332846 A1* 12/2010 Bowden ............ G06F 17/30097 713/189
2014/0195545 A1* 7/2014 Anand ................ H04L 45/7453 707/747
2017/0091002 A1* 3/2017 Chen ....................... G06F 9/545

OTHER PUBLICATIONS

*Intel®64 and IA-32 Architectures Optimization Reference Manual*, Technical report, 2015, 654 pages, http://www.intel.com/content/dam/www/public/us/en/documents/manuals/64-ia-32-architectures-optimization-manual.pdf.
*Intel Architecture Instruction Set Extensions Programming Reference*, Technical report, 2015, 1178 pages, http://software.intel.com/en-us/intel-isa-extensions.
SNIA Advancing storage & information technology, *NVM Programming Model (NPM) Version 1.1*, Technical report, 2015, 85 pages, http://www.snia.org/sites/default/files/NVMProgrammingModel_v1.1.pdf.
D. Apalkov et al., *Spin-Transfer Torque Magnetic Random Access Memory (STT-MRAM)*, ACM Journal on Emerging Technologies in Computing Systems, vol. 9(2), May 2013, 35 pages.

(Continued)

*Primary Examiner* — Brandon S Hoffman
*Assistant Examiner* — Nega Woldemariam
(74) *Attorney, Agent, or Firm* — Sterne, Kessler, Goldstein & Fox P.L.L.C.

(57) ABSTRACT

Disclosed herein are system, method, and computer program product embodiments for accessing and managing storage class memory (SCM) enabled main-memory database structures. An embodiment operates by traversing a first node to find a location of a second node corresponding to a search key, calculating a hash value for the search key, comparing the calculated hash value with at least one fingerprint value stored in the second node, wherein the fingerprint value is determined by hashing a stored key, accessing at least one key-value pair having a matching hash value, and returning a value associated with the matching key-value pair, wherein at least one of the traversing, calculating, comparing, accessing, and returning are performed by one or more computers.

20 Claims, 8 Drawing Sheets

(56) References Cited

OTHER PUBLICATIONS

Joy Arulraj et al., *Let's talk about storage & recovery methods for non-volatile memory database systems*, ACM SIGMOD, 2015, 16 pages.
Geoffrey W. Burr et al., *Phase change memory technology*, Journal of Vacuum Science & Technology B, vol. 28(2), 2010, 49 pages.
Andreas Chatzistergiou et al., *Rewind: Recovery write-ahead system for in-memory non-volatile data-structures*, Proceedings of the VLDB Endowment, vol. 8(5), 2015, 12 pages.
Shimin Chen et al., *Rethinking database algorithms for phase change memory*, CIDR, 2011, 11 pages.
Shimin Chen and Qin Jin, *Persistent B+-Trees in Non-Volatile Main Memory*, Proceedings of the VLDB Endowment, vol. 8(7), 2015.
Joel Coburn et al., *NV-Heaps: Making persistent objects fast and safe with next-generation*, non-volatile memories, ACM, vol. 47(4), 2011, 13 pages.
Jeremy Condit et al., *Better I/O through byte-addressable, persistent memory*, ACM, 2009, 14 pages.
Subramanya R. Dulloor et al., *System software for persistent memory*, EuroSys, 2014, 25 pages.
Ru Fang et al., *High performance database logging using storage class memory*, IEEE ICDE, 2011, 11 pages.
Tomas Karnagel et al., *Improving in-memory database index performance with Intel® transactional synchronization extensions*, IEEE HPCA, 2014, 12 pages.
Hideaki Kimura, *FOEDUS: OLTP engine for a thousand cores and NVRAM*, ACM SIGMOD, 2015, 17 pages.
Dushyanth Narayanan and Orion Hodson, *Whole-system persistence*, ASPLOS, 2012, 10 pages.
Ismail Oukid et al., *SOFORT: A hybrid SCM-DRAM storage engine for fast data recovery*, ACM DaMoN, 2014, 31 pages.
Ismail Oukid et al., *Instant recovery for main-memory databases*, CIDR, 2015, 9 pages.
Steven Pelley et al., *Storage Management in the NVRAM Era*, Proceedings of the VLDB Endowment, vol. 7(2), 2013, 12 pages.
Shivaram Venkataraman et al., *Consistent and durable data structures for non-volatile byte-addressable memory*, USENIX FAST, 2011, 15 pages.
Stratis D. Viglas, *Write-limited sorts and joins for persistent memory*, Proceedings of the VLDB Endowment, vol. 7(5), 2014, 13 pages.
Haris Volos et al., *Mnemosyne: Lightweight persistent memory*, SIGPLAN, vol. 47(4), 2011, 13 pages.
Tianzheng Wang and Ryan Johnson, *Scalable logging through emerging non-volatile memory*, Proceedings of the VLDB Endowment, vol. 7(10), 2014, 12 pages.
Jun Yang et al., *NV-Tree: Reducing consistency cost for NVM-based single level systems*, USENIX FAST, 2015, 16 pages.
J. Joshua Yang and R. Stanley Williams, *Memristive Devices in Computing System: Promises and Challenges*, ACM Journal on Emerging Technologies in Computing Systems, vol. 9(2), May 2013, 20 pages.
Jishen Zhao et al., *Kiln: Closing the performance gap between systems with and without persistence support*, IEEE/ACM MICRO-46, 2013, 12 pages.
European Search Report directed to related European Application No. 16002235.6, dated Feb. 13, 2017; 9 pages.
Biplob Debnath et al., "ChunkStash: Speeding up Inline Storage Deduplication using Flash Memory," May 14, 2010; 15 pages.
Victor Alvarez et al., "A Comparison of Adaptive Radix Trees and Hash Tables," 2015 IEEE 31st International Conference on Data Engineering, IEEE, Apr. 13, 2015, pp. 1227-1238.
Gabriel Antoniu, et al., "An Efficient and Transparent Thread Migration Scheme in the PM2 Runtime System," Network and Parallel Computing, Jan. 2, 1999, submitted Feb. 11, 2011; 16 pages.

* cited by examiner

SECONDARY DATA STRUCTURES FOR STORAGE CLASS MEMORY (SCM) ENABLES MAIN-MEMORY DATABASES

BACKGROUND

Many types of storage devices have emerged throughout the years with different characteristics. To keep up with today's CPU frequencies, one needs a fast memory device, able to serve requests within a few clock cycles. Nearly all commercial database systems rely on caching techniques to improve performance. Caches are often implemented in memory that can be accessed quickly, such as random access memory (RAM) and static random access memory (SRAM), as opposed to storage that takes longer to access, such as disk-based storage. Caches typically store frequently used data and reduce the time needed by a database system to access a data page. RAM, however, is much more costly than disk-based storage.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for accessing and managing storage class memory (SCM) enabled main-memory database structures.

Figure 1:
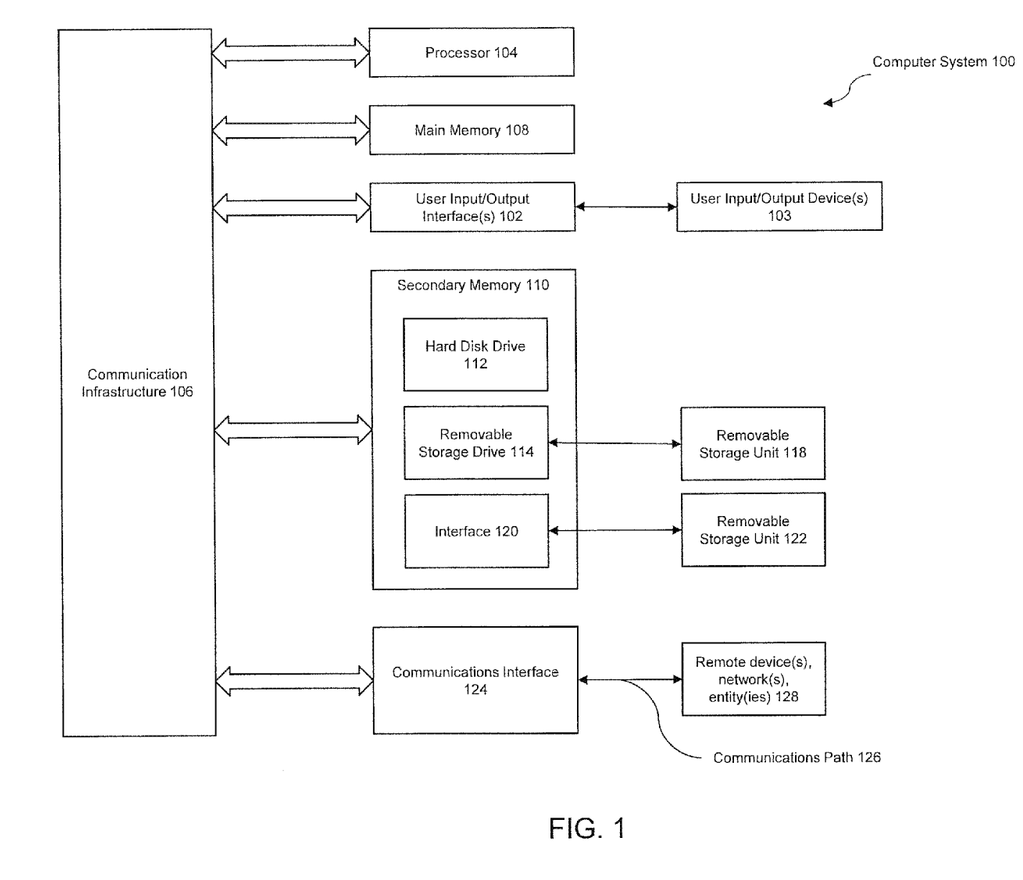
FIG. 1 is an example computer system useful for implementing various embodiments.

Various embodiments can be implemented, for example, using one or more well-known computer systems, such as computer system 100 shown in FIG. 1. Computer system 100 can be any well-known computer capable of performing the functions described herein.

Computer system 100 includes one or more processors (also called central processing units, or CPUs), such as a processor 104. Processor 104 is connected to a communication infrastructure or bus 106.

One or more processors 104 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 100 also includes user input/output device(s) 103, such as monitors, keyboards, pointing devices, etc., that communicate with communication infrastructure 106 through user input/output interface(s) 102.

Computer system 100 also includes a main or primary memory 108, such as random access memory (RAM). Main memory 108 may include one or more levels of cache. Main memory 108 has stored therein control logic (i.e., computer software) and/or data.

Computer system 100 may also include one or more secondary storage devices or memory 110. Secondary memory 110 may include, for example, a hard disk drive 112 and/or a removable storage device or drive 114. Removable storage drive 114 may be a floppy disk drive, a magnetic tape drive, a compact disk drive, an optical storage device, tape backup device, and/or any other storage device/drive.

Removable storage drive 114 may interact with a removable storage unit 118. Removable storage unit 118 includes a computer usable or readable storage device having stored thereon computer software (control logic) and/or data. Removable storage unit 118 may be a floppy disk, magnetic tape, compact disk, DVD, optical storage disk, and/any other computer data storage device. Removable storage drive 114 reads from and/or writes to removable storage unit 118 in a well-known manner.

According to an exemplary embodiment, secondary memory 110 may include other means, instrumentalities or other approaches for allowing computer programs and/or other instructions and/or data to be accessed by computer system 100. Such means, instrumentalities or other approaches may include, for example, a removable storage unit 122 and an interface 120. Examples of the removable storage unit 122 and the interface 120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 100 may further include a communication or network interface 124. Communication interface 124 enables computer system 100 to communicate and interact with any combination of remote devices, remote networks, remote entities, etc. (individually and collectively referenced by reference number 128). For example, communication interface 124 may allow computer system 100 to communicate with remote devices 128 over communications path 126, which may be wired and/or wireless, and which may include any combination of LANs, WANs, the Internet, etc. Control logic and/or data may be transmitted to and from computer system 100 via communication path 126.

In an embodiment, a tangible apparatus or article of manufacture comprising a tangible computer useable or readable medium having control logic (software) stored thereon is also referred to herein as a computer program product or program storage device. This includes, but is not limited to, computer system 100, main memory 108, secondary memory 110, and removable storage units 118 and 122, as well as tangible articles of manufacture embodying any combination of the foregoing. Such control logic, when executed by one or more data processing devices (such as computer system 100), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 1. In particular, embodiments may operate with software, hardware, and/or operating system implementations other than those described herein.

Figure 2:
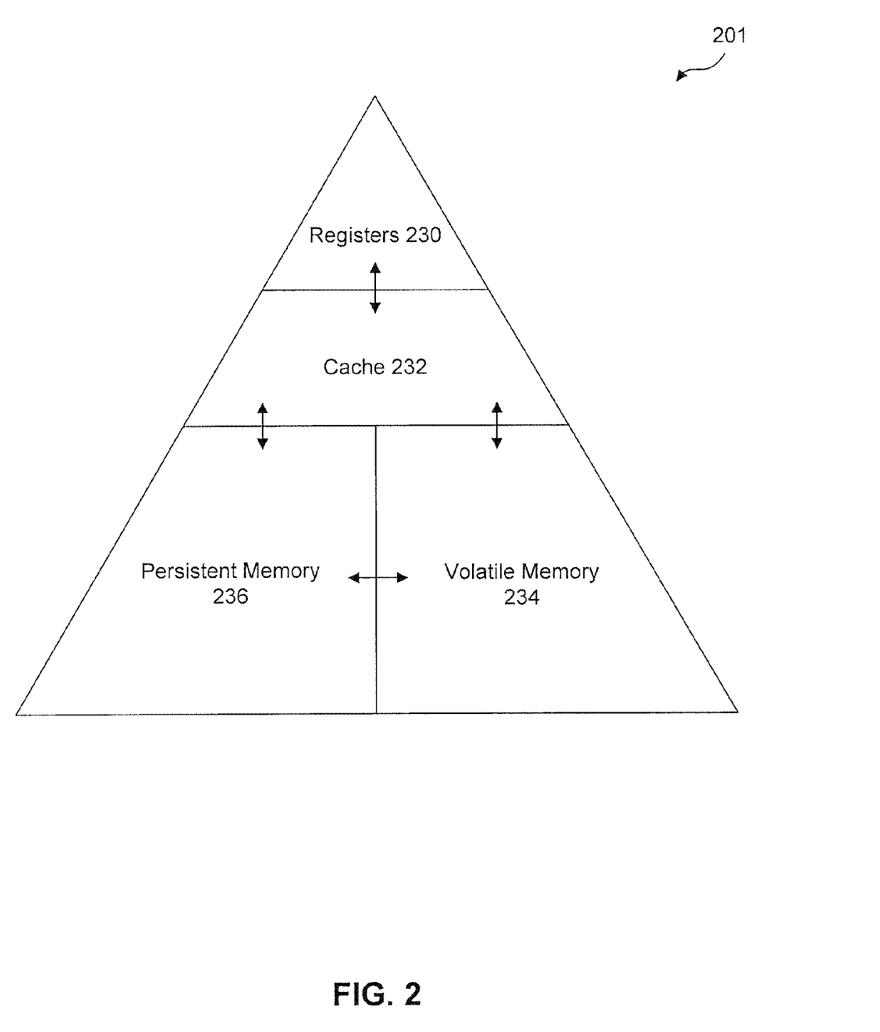
FIG. 2 is a block diagram of a memory hierarchy that includes a persistent and volatile memory, according to an example embodiment.

FIG. 2 depicts an embodiment of a possible memory hierarchy 201 used within the disclosed computer system. As shown, the memory hierarchy arranges different technologies of storage devices in layers to improve data access efficiency. CPU instructions are able to work with registers 230 which are limited in number. CPU registers may be directly embedded in the CPU core and allow very fast access to stored data. When the CPU needs to access data that is not already in its registers, the CPU must fetch the data from a memory layer below. As illustrated, cache memory 232, such as static random access memory (SRAM), may be implemented to provide the CPU registers with relatively fast access to the cache memory data. Due to its storage and latency characteristics, along with its proximity to the registers, cache 232 may be expensive and may have a limited storage capacity. As a result, the memory hierarchy may need additional layers. An additional layer of memory may include volatile memory 234, such as dynamic random access memory (DRAM), which provides larger storage capacities with desirable latency characteristics. As depicted, volatile memory 234 may be in communication with both cache 232 and persistent memory 236. Persistent memory 236 may be configured to store critical data required by a process. Further, persistent memory 236 may be non-volatile, having the capacity to retain the data when powered off or when a failure occurs. As shown, persistent memory 236 may be in communication with both cache 232 and volatile memory 234. Further, in order to provide the desirable characteristics of both storage and main memory, persistent memory 236 may be implemented using Storage Class Memory (SCM).

As used herein, the term SCM is a generic designation for any memory device that exhibits characteristics from both the storage and main memory level of the memory hierarchy. SCM can serve as storage in the sense that it is non-volatile, and provides storage capacities similar to that of a solid-state drive (SSD) and hard drives. The SCM may serve as main memory in the sense that it is byte-addressable and exposes latencies and bandwidth on approximately the same order of magnitude as usual DRAM. SCM may be a merging point between memory and storage, collapsing the two last levels of the memory hierarchy into a single level.

In an embodiment, at least one of volatile memory 234 and persistent memory 236 may be organized using a tree data structure, such as a B-Tree or a B+-Tree.

As used herein, a B+-Tree (or alternatively a B-Tree) is an n-ary tree having a root node, at least one inner node, and at least one leaf node. The inner nodes are located in the tree between the root node and the leaf nodes, and contain keys and pointers to leaf nodes. The leaf nodes include a next-pointer and key-value pairs, i.e., keys and the values associated with each respective key. In an embodiment, the leaf nodes may further include a bitmap and/or a lock. The leaf nodes are at a bottom level in the B+-Tree and are stored in persistent memory, such as SCM.

Figure 3:
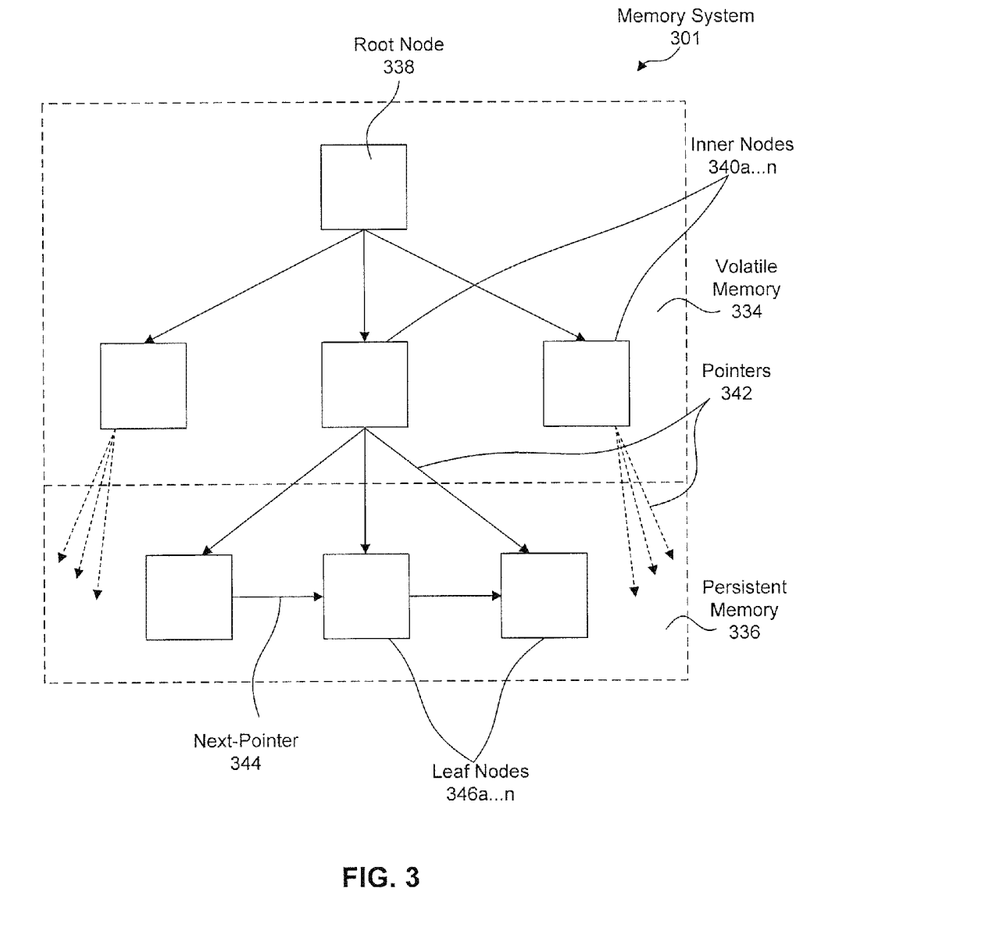
FIG. 3 is a block diagram of a memory system that includes a tree array located in persistent memory and volatile memory, according to an example embodiment.

According to an example embodiment, FIG. 3 illustrates a memory system 301 that includes a B-Tree array located in both persistent memory 336 and volatile memory 334. As depicted, root node 338 may contain pointers (not labeled) that point to inner nodes 340a-n. Inner nodes 340a-n may contain keys (not shown) and pointers 342 to leaf nodes 346a-n. In addition to storing key-value pairs (not shown), leaf nodes 346a-n also store next-pointer 344. In such an embodiment, root node 338 and inner nodes 340a-n may be located within volatile memory 334. However, it is contemplated that at least one of the root node 338 and inner nodes 340a-n may be located with persistent memory 336.

Figure 4A:
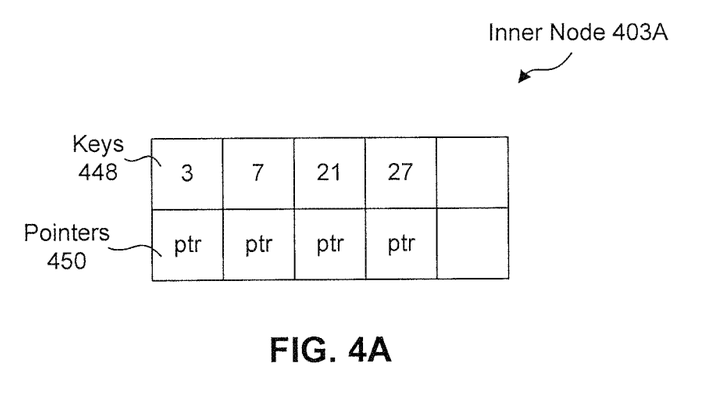
FIGS. 4A-4D are block diagrams of memory nodes, according to example embodiments.

FIG. 4A provides a possible implementation of inner node 403A. Inner nodes have a structure with a number (n) of keys ($K_i$) 448 and a number (n+1) of pointers $p_i$ 450, where $p_i$ points to children nodes, which may be implemented as leaf nodes.

Figure 4B:
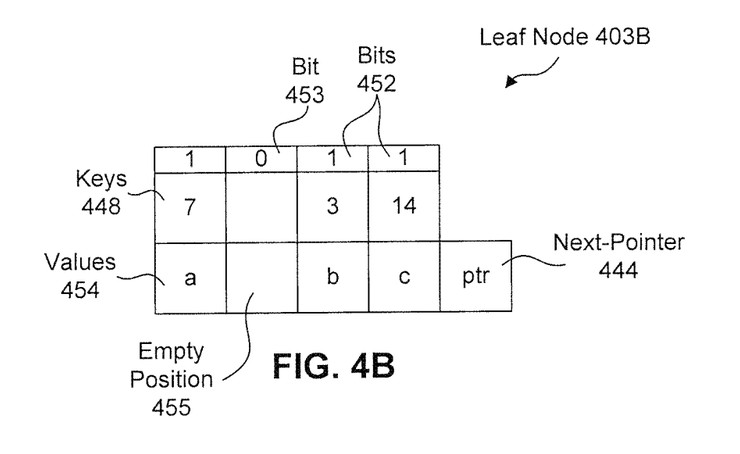

FIG. 4B provides an example implementation of leaf node 403B. In an embodiment, a leaf of size m may comprise two static arrays of size m in order to hold keys 448, values 454, and next-pointer 444 which points to the next leaf. Leaf node 403B may also include a bitmap having m bits, which may be used to indicate the status of the positions associated with each bit. For example, bits 452 are used to mark positions within the arrays containing valid records. Bit 453 may be used to mark a position that is empty 455 or which may be otherwise invalid. As depicted, the keys and values may be kept in two separated arrays to increase the cache efficiency. In additional embodiments, however, a single array may be used to hold both key-value pairs. As depicted, the leaf node may contain keys 448 and values 454 associated with each key 448.

A bitmap may be used to apply the changes in a leaf atomically. Such changes are made visible by updating the bitmap. Due to some constraints, namely, that the writes to the bitmap should be atomic, the bitmap size may be limited based on the size of the memory bus. For example, in some embodiments the bitmap may be 8 bytes, such that up to 64 key-value pairs can be stored in a leaf. In embodiments where the field being written to is no larger that the memory bus width, atomicity may be ensured.

The top node may be denoted as the root. Some metrics can be defined, such as size, order, fan-out, depth, and fill factor. In an embodiment, the inner nodes may be stored in volatile memory such as DRAM. In additional embodiments, however, the inner nodes may be stored in persistent memory such as SCM. As a result, some portions of the B-Tree may be stored within volatile memory while other portions may be stored within persistent memory, thereby forming a P-Tree stored on a hybrid of volatile and persistent memory structures.

As used herein, next-pointers are pointers stored within the leaf that may point to the next leaf. Next-pointers may be implemented as a linked list and, as such, the system may perform range queries. Further, the traversal of the leaves during recovery to rebuild the inner nodes may also be allowed.

In an embodiment, leaf nodes may further include a fingerprint. As used herein a node fingerprint may contain information about the keys and values stored within the node. The information stored in the fingerprint may include a hash value for each key stored within the node. Fingerprinting may help the system avoid cache misses. In such embodiments, the fingerprint may be located on the first cache line of the node.

The hash value may be calculated using a modulo operation. For example, in an embodiment, the hash value may be calculated by taking the key value modulo 16, e.g., hash value=key mod 16. It is also contemplated that different integers may be used for the modulo operation.

The size of a B+-Tree, as described herein, is the number of records, i.e., key-value pairs, stored in the B+-Tree.

The order of a B+-Tree, as described herein, generally noted b, is the capacity of the inner nodes, also stated as the number of children they can hold.

The fan-out m of an inner node, as used herein, is the number of children stemming from that particular inner node. For the B+-Tree, the fan-out number may be constrained, so that [b/2] is less than or equal to m, which is less than or equal to b. The root may be the only node allowed to be underflow.

The depth of a B+-Tree, as used herein, is the number of nodes along a root-to-leaf path. It is logarithmic with the size of the B+-Tree.

The fill factor (f) of a leaf node, as used herein, is the ratio between the number of records in the leaf and the capacity of the leaf. For the B+-Tree, in an embodiment, this number is constrained, so that [(b−1)/2] is less than or equal to f, which is less than or equal to b−1. Thus the average fill factor of a B+-Tree varies between 50% and 100%. In an embodiment, the fill-factor may generally fall around 70%.

For example, in an embodiment, the B-Tree may have a branching factor 5, and a size of 17 records. In such an embodiment, the fan-out of the inner nodes is between 3 and 5, and each node contains between 2 and 4 keys. The depth of the tree according to this embodiment is 3, and the average fill factor of the leaves is [17/20]=0.85, or 85%.

In another embodiment, using the look-up for the key 34 as an example, the system performs a binary search in the root to find the pointer corresponding to the key 34. Since 24 is less than or equal to 34, a second pointer may be used. The system may repeat this process until the appropriate leaf is reached. If the system finds the key in the leaf, the system retrieves the corresponding value.

When a program crashes and is restarted, it receives a new address space, which generally means its previous pointers become invalid. In some cases, the program may restart in the same address space, but operating systems do not provide guarantees that the previous address space will still be available when we restart the program. As a result, Persistent Pointers (PPtrs), which are a combination of a persistent memory segment id and an offset within this segment, may also be translated to a regular pointer. As used herein, a segment may comprise at least one memory page.

In some embodiments, a persistent allocator may map the persistent memory pages to the virtual memory space.

As used herein, critical data may refer to any piece of data whose loss may be unrecoverable and causes a loss of information. On the contrary, non-critical data, as used herein, may be any piece of data which may be recovered after being lost. Selective persistency may be implemented in order to store, on the SCM, the minimal set of critical data, which may provide the necessary information to fully rebuild non-critical data which may be stored in volatile memory, such as DRAM.

In an embodiment, a B+-Tree may be used to illustrate that leaf nodes are critical data, as there is no means to recover the data contained in a leaf if it were to be lost. On the other side, inner nodes are non-critical, due to the fact that they only contain the highest keys from each leaf, and pointers to those leaves. This information may be retrieved as long as the leaves are in a consistent state and the next pointers are consistent. Inner nodes may keep a classical structure and may fully reside in volatile memory, such as DRAM. As shown, leaf nodes may reside on the SCM to ensure the consistency and performance of operations on leaves.

As used herein, a critical operation is an operation on the B-Tree that might break its consistency. Critical operations may include operations such as initialization of the B-tree, insertion/deletion of a key-value pair from a leaf, splitting/merging of a leaf, and other operations known in the art. Non-critical operations may include operations such as reading data in the B-Tree and writing in the inner nodes. In such non-critical operations, the consistency is not altered, or in the alternative, consistency need not be enforced.

Critical operations ensure that the B-Tree will be left in a valid or recoverable state. This may be done either by making any changes atomically visible or by using micro-logging in more complex cases. A persistent object within the B-Tree may be used to store any information that will be necessary to perform the recovery. In event of a failure during a critical operation, a recovery function may be called in order to access the information stored in the persistent recovery object.

As mentioned above, the initialization of the B-Tree is a critical operation because it writes critical data. In an embodiment, the initialization process may only be called once (relative to insertions/deletions/splits which might get called millions of time). Consistency may be enforced by redoing the entire, or a portion of, initialization if a failure happened before the initialization is completed. Initialization may include: creating a recovery item, or micro-log, used for logging when doing leaf splits; allocating and initializing the first leaf as the head of the next pointer, which may be implemented as a linked list; allocating and initializing a root node; and initializing member variables, which may include variable such as: allocator used, size of the tree, number of leaves and inner nodes, depth, and more.

In an embodiment, the system may determine whether the initialization was successful. For example, in such an embodiment, the system may determine the variable containing the number of leaves in the tree and compare the determined number with the last persistent variable to be written in the initialization. If the numbers are different, the system will restart a portion of, or the entire, initialization process. In some embodiments, the initialization process may restart from the beginning of the entire process. In other embodiments, the initialization process may restart from a determined point.

In accordance with the definition of a critical operation, described above, key lookup is not a critical operation. In an embodiment, a lookup may start by traversing the inner nodes to find a leaf corresponding to the search key. When the leaf is reached, the bitmap is read to retrieve and determine the leaf positions containing valid key-value pairs. In such embodiments, the positions may be read until the search key is found and the corresponding value is returned. In embodiments where the records are not sorted in the leaves, the positions may be read sequentially. In such embodiments, it may be prudent to provide smaller leaves, as the search time grows linearly with the size of the leaves, and not logarithmically as may be the case with sorted leaves.

Figure 7:
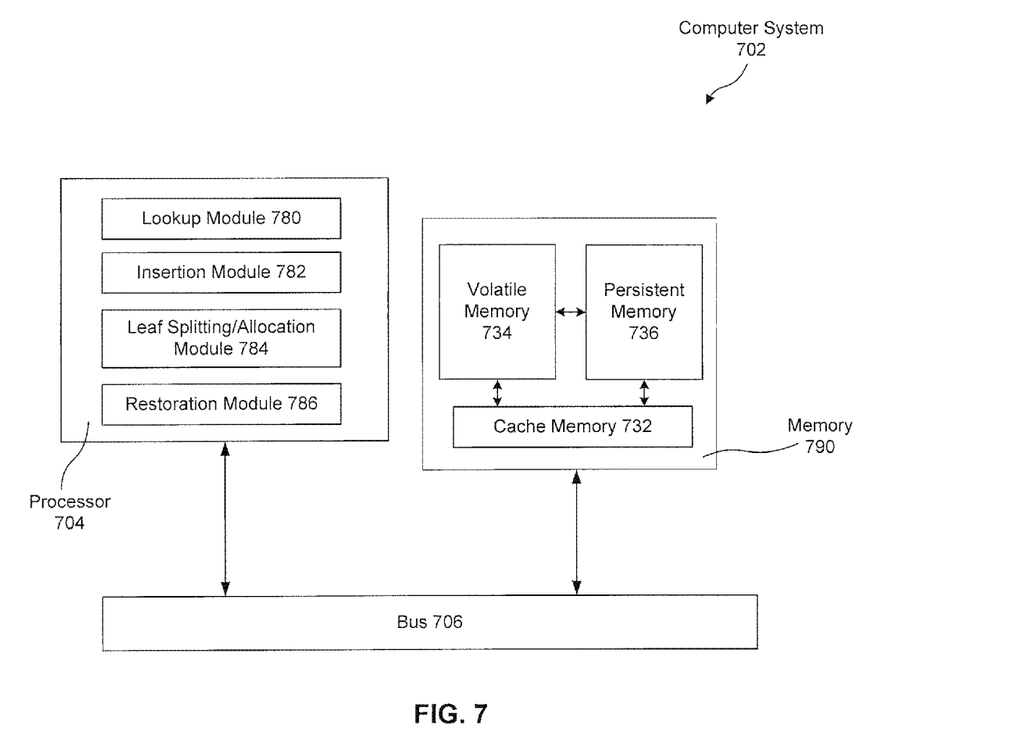
FIG. 7 is a functional block diagram of a computer system useful for implementing various embodiments.

Various embodiments may be implemented, for example, using an example computer system 702 shown in FIG. 7. Computer system 702 can be implemented using any well-known computer capable of performing the functions described herein (such as that shown in FIG. 1, for example).

Computer system 702 includes one or more processors 704 comprising at least one of lookup module 780, insertion module 782, leaf splitting/allocation module 784, and restoration module 786. In an embodiment, the lookup module 780, insertion module 782, leaf splitting/allocation module 784, and restoration module 786 have the functionality described herein and are implemented as software executing in processor(s) 704.

Computer system 702 is connected to memory 790 through a communication infrastructure or bus 706.

Memory 790 includes a plurality of memory types. For example, memory 790 may comprise cache memory 732, volatile memory 734, and persistent memory 736. Various data schemas may be used to perform the functions described herein.

For example, in an embodiment, a leaf may follow one of at least two schemes. First, a leaf may follow a scheme where the keys and values are stored in two separate arrays. In an additional embodiment, however, a leaf may follow a scheme where the keys and values are packed together as pairs in a single array. These two example schemes may lead to a different memory organization of the leaf, with different cache line uses. As shown below, keys and values may be 8 bytes long, the bitmap may be 8 bytes and the next pointer may be 16 bytes. In an embodiment, a cache line size of 32 bytes may be provided. It is also contemplated that a cache line of 64 bytes may also be implemented into the current system. These and additional schemes may be implemented in order to achieve desired performance and latency characteristics. For example, a fingerprinting technique may be used. As mentioned above, a node fingerprint may contain information about the keys, values, and/or key-value pairs stored within the respective nodes. In an embodiment, the fingerprint may provide a computer system (such as computer system 702, illustrated in FIG. 7) with enough information to access a specific node position without having to traverse each position on the node.

Figures 4C, 4D:
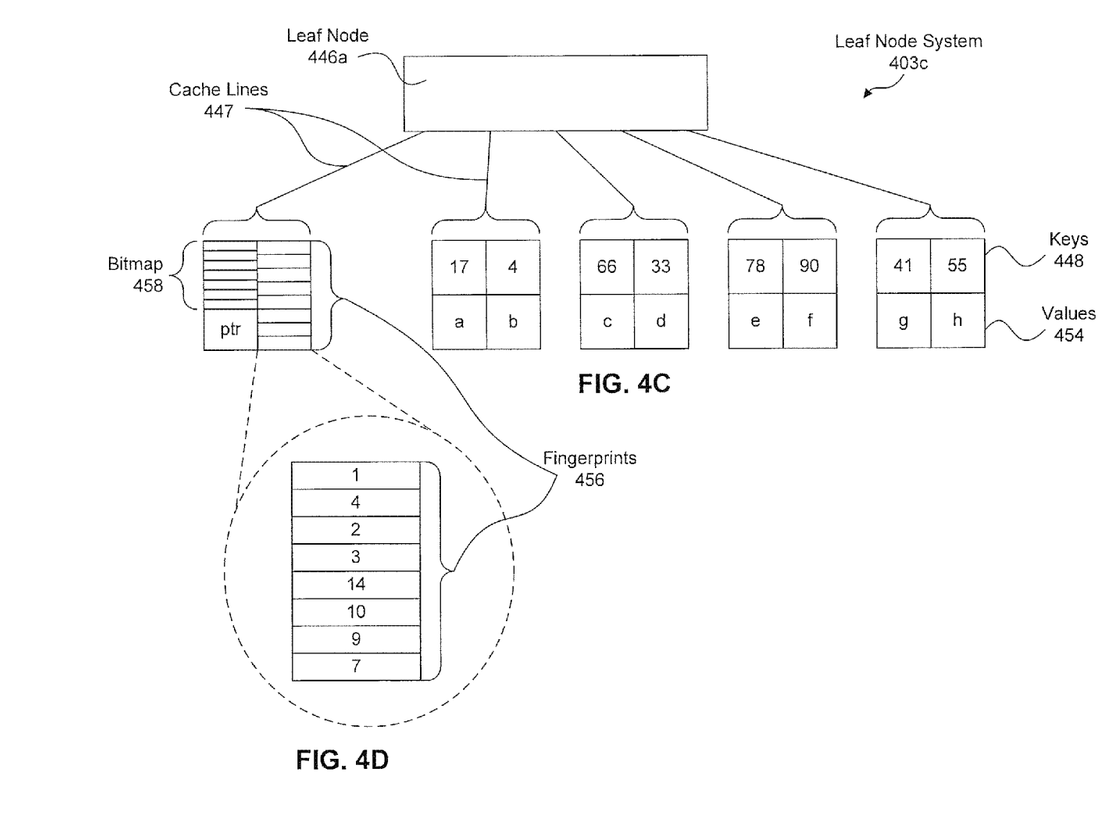

FIGS. 4C and 4D illustrate leaf node system 403c, which provides an example of how fingerprinting may be implemented in leaf node 446a. For illustration purposes only, the cache lines 447 of leaf node 446a are separated. As depicted, one cache line (not labeled) may include a next-pointer (ptr), fingerprints 456, and bitmap 458 to mark the position in the arrays containing valid records, positions that are either empty, or positions that are otherwise invalid.

In an embodiment, fingerprinting may be performed by including as much information as possible in the first cache line of the leaf, to provide the system with enough information to determine where the desired key value pair resides. In some embodiments that employ fingerprinting techniques, the number of cache misses may be as low as two or fewer cache misses per query.

To incorporate fingerprinting, a computer system (such as computer system 702 of FIG. 7) may group key-value pairs together in the cache lines following the first cache line, as depicted in FIG. 4C. Additionally, the first cache line of the leaf may hold a bitmap and fingerprints corresponding to the respective cache lines. In an embodiment, the fingerprints may be a hash of the keys stored in the leaf.

In embodiments where the system is employing a fingerprinting technique, when performing a lookup, the system first computes the fingerprint of the search key. The system may then access the first line to retrieve the bitmap and the fingerprints of the keys stored in the leaf. For each valid position indicated in the bitmap, the system may compare the fingerprint stored at that position with the fingerprint computed for the search key. If the system finds a match, the system will retrieve the corresponding cache line, i.e., the cache line containing the key, and confirm whether the retrieved key is the correct key. When confirmed, the system retrieves the associated value. If the retrieved key is not a match, the system may continue searching.

As may be appreciated in the art, using a hash function to compute the fingerprints may introduce collisions, where the computed hash value for one key may be the same as, i.e., equal to, the computed hash for a separate or different key. In such instances the system would find that the retrieved key does not match the desired key and the system would continue searching, as described above.

In the embodiment described above, the lookup algorithm first reads the bitmap in the first cache line, and then reads the keys sequentially until finding the corresponding key, or reaching the last key. As a result, it may be appreciated that the configurations may provide different performance characteristics. For example, one configuration may provide fewer cache misses, whereas in another configuration, half of the cache lines read may contain values which aren't used.

Figure 5:
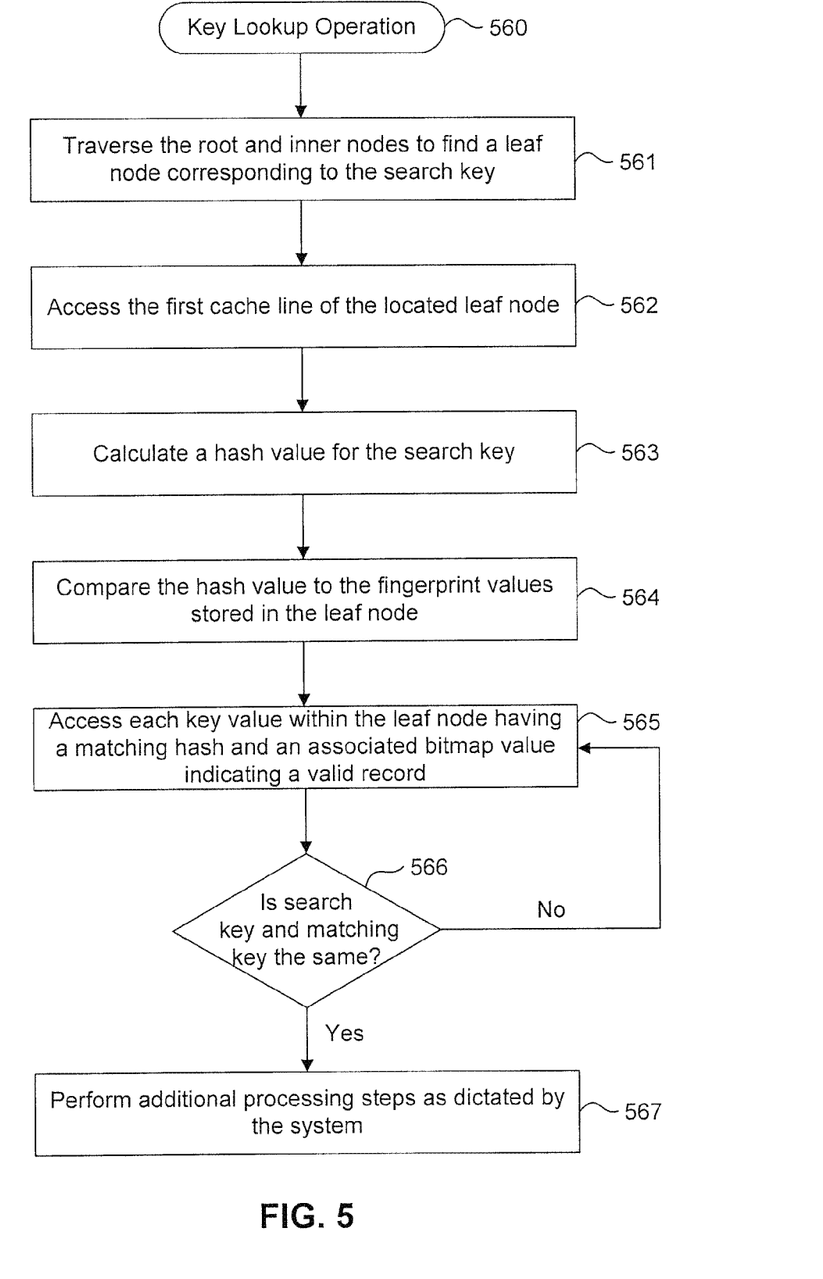
FIG. 5 is a flowchart illustrating a process for accessing a node value, according to an example embodiment.

FIG. 5 is a flowchart for a method 560 for a key lookup operation, according to an embodiment. As performed by lookup module 780, method 560 can be performed by processing logic that can comprise hardware (e.g., circuitry, dedicated logic, programmable logic, microcode, etc.), software (e.g., instructions that run on a processing device), or a combination thereof. In accordance with this embodiment, at step 561, a system (such as computer system 702, illustrated in FIG. 7) may traverse the root and inner nodes to find and read the pointers that point to a leaf node corresponding to the search key.

At step 562, the system may access the first cache line of the located leaf node. The system may then calculate the hash value of the search key at step 563. In other embodiments, the hash value may be calculated before or simultaneously with steps 561 and/or 562.

At step 564, the system compares the calculated hash value to the fingerprint values stored in the leaf node. Step 564 may further include comparing the calculated hash value to fingerprint values only having a corresponding bitmap value indicating a valid record.

At step 565, the system directly accesses each key within the leaf node having a matching hash value. In an additional embodiment, the system may access each key within the leaf node having both a matching hash value and a corresponding bitmap value indicating a valid record.

At step 566, the system compares the search key with the accessed key to determine whether the correct key, and value, have been located. When the search key and the accessed key are not the same, the system returns to step 565 and accesses the next key within the leaf node having a matching hash value. If however, at step 566 the search key and the accessed key are the same, the system may perform additional processing steps as directed, according to step 567.

In other embodiments, step 567 may include returning the value associated with the matching key. In additional embodiments, at step 567, the system may make decisions to determine whether a value should be inserted and/or deleted.

As performed by insertion module 782, insertion and/or deletion operations may begin with a regular lookup in order to find the appropriate leaf. During an insertion operation, if the system is configured to prevent duplicates, a lookup for the key stored in the leaf may be performed. In such embodiments, the insertion operation may proceed only when the value wasn't found during the lookup, for example, at steps 564 and 566. If the system is configured to allow duplicates, the insertion operation may be completed without condition, i.e., without the lookup.

Figure 6:
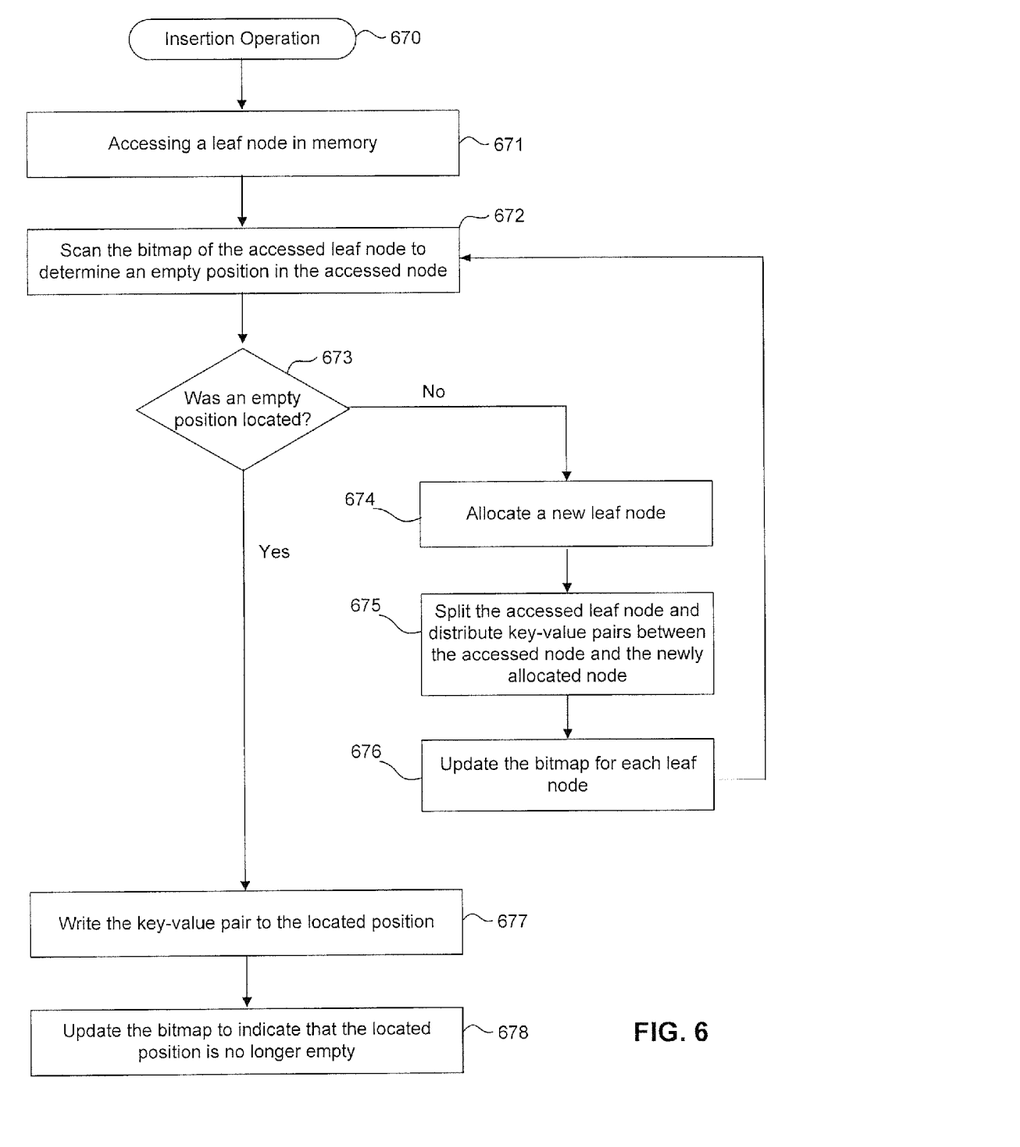
FIG. 6 is a flowchart illustrating a process for inserting a node value, according to an example embodiment.

FIG. 6 is a flowchart for a method 670 for an insertion operation, according to an embodiment. Method 670 can be performed by processing logic that can comprise hardware (e.g., circuitry, dedicated logic, programmable logic, microcode, etc.), software (e.g., instructions running on a processing device), or a combination thereof. In such an embodiment, the insertion operation may be performed by accessing a leaf node in memory, in accordance with step 661.

At step 672, a system (such as computer system 702 of FIG. 7) may scan the bitmap of the accessed leaf node to determine a position corresponding to an empty slot in the leaf. That is a position where the system may insert the key-value pair. In some embodiments, an empty slot may be indicated using a zero or logic false (such as Bit 453 in FIG. 4B), while in other embodiments, an empty slot may be indicated using a one or logic true.

At step 673, the system may determine whether an empty position has been located. In the case where a bitmap contains no empty slots (i.e. the leaf is full), the system may allocate a new leaf node, at step 674. Further, the system may split the accessed node and distribute the key-value pairs between the accessed node and the newly allocated node, in accordance with step 675. Additionally, the system may update the bitmap associated with each leaf, as provided at step 676, before returning to step 672.

Returning to step 673, when the system has located an empty slot, then at step 677, the key value pair can be written in place at this position. The change, i.e., the key value pair that has just been written, may be made visible atomically by setting the corresponding position in the bitmap to indicate that the slot is now in use, in accordance with step 678. As mentioned above, it is to be noted that for this write to be atomic, the bitmap needs to be at least the width of the memory bus.

In an embodiment, each of the leaves may be kept persistent during insertions and splits, which may require flushes and some micro-logging when splitting in order to maintain more consistent data.

Flush instructions may be added after each write instruction to avoid any potential re-ordering from the CPU and to ensure that data may be written back to the persistent memory in time.

As may be readily apparent to one skilled in the art, at least one potential benefit for using the bitmap implementation may include, that the tree may remain in a consistent state, thereby potentially alleviating the need for logging or even recovery because the inserted key-value pair is made visible with an atomic write of the bitmap.

In an embodiment, the deletion operation may be completed by setting a corresponding bit in the bitmap to 'empty,' and in some embodiments, performing a flush operation. As noted above, an empty slot in the bitmap may be indicated using a zero or logic false, or in the alternative, by using a one or logic true, depending on the desired configuration.

In an embodiment, in accordance with insertion operation 670 above, when trying to insert a new key-value pair in a leaf that is full and has no empty slots, i.e., when the bitmap contains no 0s, the system may be configured to split the leaf. In an embodiment, leaf splitting/allocation module 784 may direct a leaf split in two phases: first, the actual split of the leaf and second, the system may update the parent data. In such an embodiment, the first phase modifies critical data while the second phase modifies inner nodes, which may be rebuilt after a failure.

In an embodiment where unsorted leaves are used, a bitmap (such as bitmap 458 illustrated in FIG. 4C) may allow for an efficient split of the leaves through potential steps, including: first, creating a recovery item or micro-log, used for logging the leaf split; second, creating a new leaf by making a copy of the leaf that is to be split; third, updating the bitmap in the new leaf (as described by step 676 of FIG. 6) to keep the upper half, or alternatively the lower half, of the keys as valid; and fourth, updating the bitmap and the next pointer of the leaf splitting, atomically. In this example embodiment, no changes are made to the original leaf during the first and second steps, and as such, if a crash occurs anywhere before the third step, the recovery may consist of deallocating the new leaf that was just allocated. As a result, the tree would revert back to its pre-split state. Additionally, as described, the third step may modify the tree. In an embodiment, the third step may be completed atomically using the bitmap. Further, in some embodiments, the bitmap and the next-pointer may reside in the same cache line. In additional embodiments, in the case of failure, the recovery item or micro-log may be used to retrieve the newly allocated leaf and the leaf being split.

In embodiments where the leaf nodes are sorted, step 567 of FIG. 5 may include additional shifting and writing steps, which may be used to maintain proper sorting.

In the event of a crash, restoration module 786 may determine the processing step at which the crash occurred. As mentioned above, in an embodiment, at the beginning of the leaf split, a recovery item or micro-log, is stored. In such embodiments, the recovery item may include information, including: persistent pointers to the leaf currently splitting and persistent pointers to the newly allocated leaf. When the split is complete, the persistent pointers may be reset.

In an embodiment, during recovery, the system may determine whether the pointers are pointing to valid locations. More specifically, restoration module 786 may determine whether the crash occurred before a leaf split had been fully completed. If the leaf split was not fully completed, the system may determine whether the third step had been successfully completed, that is, if the next pointer of the leaf splitting is pointing to the newly allocated leaf. If this condition holds, the split has been successful. If not, the mentioned conditions are not met, and leaf splitting/allocation module 784 may deallocate the new leaf.

Upon failure, the system may recover the tree. In an embodiment, restoration module 784 may recover the tree in at least two phases, including: first, recovering the next-pointers, which may be implemented using a linked list of leaves in a consistent state, in case it has been altered; and second, rebuilding the inner nodes in volatile storage, such as DRAM, from the list of leaves.

Upon failure, leaves may be recovered according to the procedures mentioned above, such as recovery from initialization and recovery from leaf split.

In an embodiment, after a crash has occurred and the previous recovery steps have been executed, the tree may have been degenerated to a linked list of leaves containing the data. Restoration module 786 may rebuild the inner nodes in volatile memory 734, which may be implemented as DRAM, in one pass. The one-pass rebuild process may be composed of two steps: first, the system may allocate the inner nodes and second, the system may traverse the leaves to retrieve the max key and pointer to leaf pair for each leaf and insert the max key and leaf pointer pair in the corresponding inner node.

In an embodiment, restoration module 786 may first determine which of the inner nodes are needed and subsequently allocate the needed nodes. The system may then determine the number of inner nodes to be allocated, by deducing from the number of leaves. For example, the system may allocate a number of nodes at a level above the leaves. In such embodiments, the number of inner nodes to be allocated at the next level may be determined by dividing the number of leaves by m+1, where m+1 represents the number of pointers that an inner node can store. For subsequent levels, the number of inner nodes to be allocated may similarly be determined by dividing the number of inner nodes at that level by m+1, where again, m+1 represents the number of pointers that an inner node can store. This process may be repeated until only one node is needed, the remaining node is the root node.

The number of leaves may be determined through at least one of the following options: first, the system performs a first traversal of the linked list of leaves, to compute the number of leaves present; second, the system may store the number of nodes as a variable during normal execution; or third, the number of leaves may be computed during a traversal of the leaves and the max keys together. In the third option, the system may store the leaf pointers corresponding to the traversed keys in a buffer. Further, in the third option, the computed number of leaves may provide the number of inner nodes to be allocated. The key-pointers stored in the buffer may then be used to fill the allocated leaves nodes. In some embodiments, the number of nodes may be stored as a persistent variable.

As may be appreciated, each of the disclosed options may present varying performance attributes. For example, the first option may turn out to be expensive when the tree grows, while the second option requires the system to continually update the variable to keep the variable consistent with the actual number of leaves.

The system may rebuild inner nodes, in accordance with at least one embodiment. In an embodiment, eleven leaves may be used, where each node can store three pointers, and thus two keys. At the first level, [14/3]=five nodes are allocated. At the second level [5/3]=2 nodes are allocated. At the third level [2/3]=1 node is allocated. Because this is the last node, it may be designated as the root node. In an embodiment, 8 nodes are allocated, although other embodiments can have other numbers of nodes.

After the system has allocated the inner nodes, as described above, the system may then traverse the linked list of leaves. For each leaf, restoration module 786 may determine and retrieve a max key for each leaf and a pointer to that leaf. In an embodiment, the system may begin to fill the first node of the layer. This may involve storing the first m keys and m pointers retrieved, where m represents the size of the inner nodes. As a result, the first inner node has each of its keys and includes space for one more pointer, such as inner node 403A of FIG. 4A. The system may then determine, retrieve, and split the next key-pointer pair. Insertion module 782 may then insert the pointer into the remaining space of the node, in accordance with insertion operation 670 of FIG. 6. Subsequently, the system may make a new key pointer-pair by associating the leftover key with a pointer to the current node. The system may insert this new pointer-pair in the parent of the current node. The system may then repeat this procedure each time a node can't hold any more keys. In such instances, the system may pass the current key (the key to be inserted) to its parent, along with a pointer to the node.

In additional embodiments, other methods may be used to reduce the overhead of the allocation processes on SCM during splits, as described above. An embodiment includes a method for allocating groups of multiple leaves at once. The B-Tree implementation, as described above and as illustrated in FIG. 3, is generally agnostic to those groups of leaves. Rather than allocating and deallocating the leaves manually, two methods, getNewLeaf and freeLeaf may be implemented. According to an embodiment, the system may manage the leaves through two structures, including: a linked list of groups of leaves currently allocated and a dynamic array of leaves currently free and not used in the tree.

In an embodiment, the getNewLeaf method may be implemented by removing the last leaf in the free leaves vector, when the free leaves vector is not empty. Alternatively, if the vector of free leaves is empty, the system may allocate a new group of leaves, attach the new group of leaves to the end of the linked list of groups, and add its leaves to the vector of free leaves, while one leaf may be returned.

In an embodiment, when a leaf is freed by processor(s) 704, it is not directly removed from the tree. However, the freed leaf is no longer accessible by a recursive search in the tree, because the pointer to the freed leaf has been removed from its parent. In some embodiments, splitting/allocation module 784 may directly remove the freed leaf from the tree. However, it may be appreciated, that if the system were to directly remove a leaf from the tree, additional steps must be taken, by leaf splitting/allocation module 784, to update the next pointer for each remaining leaf and neighbor of the leaf, which may be a critical operation and could lead to inconsistencies. In some embodiments, the system may invoke a garbage collection process when the number of freed leaves in the tree reaches a predetermined threshold.

For example, the system may use the freeLeaf method to decrease a counter and call the garbage collection procedure, as needed. In an embodiment, when the system invokes its garbage collection procedure, the system may traverse the linked list of leaves and remove any of the freed leaves, push the freed leaves to the vector of freed leaves list, and update the next pointers for each of the respective leaves. The system may then again traverse the linked list of groups to locate and deallocate some, or all, of the empty groups.

As mentioned above, next-pointers, for example next-pointer 344 of FIG. 3 or next-pointer 444 of FIG. 4B, in the leaves may form a linked list. As may be appreciated in the art, a linked list of next-pointers may provide advantages, including: allowing the system to perform range queries and allowing the system to traverse each leaf during recovery, which may be useful while rebuilding the inner nodes.

It is contemplated herein that next-pointers may not be necessary in embodiments having a B-Tree implementation that does not require range queries. However, in such embodiments, the linked-list of groups described herein may still allow the system to traverse each leaf during recovery. Indeed, a traversal of the list of groups may lead to having reached all the leaves in the tree, including the free leaves that may be overlooked. In such embodiments, the keys retrieved may be unsorted; however, the system may perform an additional sorting step. Retrieving and sorting the keys may provide some advantages. For example, this process may be inexpensive compared to the traversal of the groups itself. As may be appreciated, an additional advantage of dropping the next pointers in the leaves may include the ability for the system to push an empty leaf into a vector of free leaves without having to account for the next pointer and without requiring a garbage collection process.

As mentioned above, the functionality described herein may be implemented using more than one processor. Because, more than one processor may seek to access and/or modify the same data at the same time, a concurrency schema may be used to ensure data concurrency. Various example, non-limiting embodiments, of contemplated concurrency schemas shall now be discussed.

In an embodiment, the system may combine its searching operations with commands that may help protect the operations from conflicting write operations. For example, the system may use Transactional Synchronization Extensions (TSX) to help protect the operations from conflicting write operations.

In another embodiment, if a concurrent write operation tries to lock the same leaf being used by the system, one of the two operations may be aborted. For example, when the system encounters a lock value, this means that a thread has acquired the lock and has committed its transaction. If a thread acquires a lock, then another thread tries to read the value of that lock before the former transaction commits, the thread will not read/acquire the lock value and the older transaction will be aborted.

As used herein, a lock may include any traditional lock that may be compatible with TSX transactions. Alternatively, in a non-limiting embodiment, a leaf node may further comprise an additional byte of data, configured to serve as a lock. In such embodiments, the additional byte may be stored next to the bitmap. In such embodiments, the processor (such as processor 104 of FIG. 1 or processor 704 of FIG. 7) may not only scan the bitmap of an accessed leaf node (such as step 672 provided in FIG. 6), but the processor may scan the additional byte to determine whether the leaf is locked. For example, when the additional byte indicates that the leaf is in use, i.e., locked, the processor may abort the transaction or the processor may postpone the transaction until the leaf is available.

When a split is needed before an insertion, the system may attempt to perform as many changes as possible inside the transaction, in an attempt to get the benefits from TSX. For example, in an embodiment, the system may perform as many operations inside the TSX transaction while postponing non-TSX transactions until the required TSX transactions are complete. As described above regarding an insertion where no split is needed, the system may traverse the tree and lock the affected leaf. At that point in that process, the actual split of the leaf has not occurred, as the inner nodes may need to be updated to allow the insertion of a new split key. In an embodiment, the insertion process may include the following steps: first, the system may compute the split key to be used; second, the system may insert the split key into the parent node, along with a temporary pointer to the current leaf; third, the system may lock the parent node, to allow the modification of the temporary pointer outside the TSX transaction; and fourth, if splits of inner node are needed, the system may perform those splits as explained above. At this point in the described embodiment, the tree is in a transient, but consistent, state. However, the temporary pointer inserted into the parent node remains pointed to the corresponding keys in the old leaf, which has not yet been modified. The system may commit the TSX transaction and the actual split of the leaf can begin. Accordingly, the system locks locations that will be updated, in both the leaf and its parent. When the split is complete, the system may update the temporary pointer in the parent node so that it points to the newly created leaf. When the updates are complete, the system may unlock the leaf and its parent.

In an embodiment, the processor (such as processor 104 of FIG. 1 or processor 704 of FIG. 7) may be configured to allow optimistic execution of lock protected code sections. The execution may be optimistic in the sense that a lock may only be acquired if a conflict between threads is detected. In such an embodiment, software may be used as a course-grained lock, however the hardware may be used as a fine-grained lock within the same embodiment. For example, when a processor (such as processor 704 of FIG. 7) attempts to access data, a corresponding lock may be read. When the corresponding lock is available, a transaction with the associated data may be started without acquiring the lock. The changes made by the processor during this transaction may be buffered using cache memory (such as cache memory 732 of FIG. 7) or any other memory capable of buffering the transactional data. If the transaction is successful, the transactional data may be atomically visible to other threads. In an embodiment, the data may not be atomically visible until the data has been committed by the processor. If the transaction is not successful, all of the buffered changes may be discarded. As a result, the processor may take the lock and begin the transaction again.

In an embodiment, the processor (such as processor 704 of FIG. 7) may be configured to detect conflicts. For example, the processor may associate each transaction with at least one read and/or write action. The processor may determine all of the memory addressed it must read from in order to perform a transaction. Likewise, the processor may determine all of the memory addresses it must write to in order to perform a transaction. Using the determined memory addresses, the processor may detect a conflict if another process writes to, or reads from, the addresses needed to complete the desired transaction.

In an embodiment, the processor (such as processor 104 of FIG. 1 or processor 704 of FIG. 7) may be configured to use a selective concurrency schema. As used herein, a selective concurrency schema may include applying a set of concurrency rules for data stored in volatile memory (such as volatile memory 734 of FIG. 7) and a separate set of concurrency rules for data stored in persistent memory (such as persistent memory 736).

In an embodiment where the processor (such as processor 104 of FIG. 1 or processor 704 of FIG. 7) performs a split transaction, a lock on the parent node, or inner node, may not be necessary. A split transaction without locking the parent node may be completed in three phases. The first phase may include looking for the leaf node by traversing the B-Tree, locking the leaf node, and committing the TSX transaction. The second phase may take place outside of a TSX transaction and may include executing a split function (such as the split functions described in steps 672-677 of FIG. 6). The third phase may include updating the parent nodes and executing any splits on the parent nodes. Because the third phase split may take place in volatile memory (such as volatile memory 734 of FIG. 7), the third phase split may not require a flushing function. Based on these characteristics, the third phase may be completed within a TSX transaction.

In an embodiment where the processor (such as processor 104 of FIG. 1 or processor 704 of FIG. 7) performs a delete transaction a lock on the parent node, or inner node, may not be necessary. In the embodiment, the processor may traverse the B-Tree until it arrives at the desired leaf. The described leaf traversal may be done within a TSX transaction. Upon reaching the leaf, the processor may determine whether the leaf contains more than one key-value pair or whether the leaf only contains the key-value pair to be deleted.

When the processor determines that the leaf contains more than one key-value pair, the leaf is locked and a TSX transaction may be committed. Outside the TSX transaction, the processor may update the bitmap position corresponding to the value-pair that is to be deleted. As mentioned above, in order to flush the invalid data, the bitmap may be set to zero to indicate that the corresponding position is empty (such as bit 453 of FIG. 4B).

When the processor has determined that the leaf only contains the key-value to be deleted, the inner nodes may be modified within a TSX transaction. The inner-node key and pointer (such as one of keys 448 and one of pointers 450 illustrated in FIG. 4A) corresponding to the accessed leaf, may be removed from the inner node so they no longer hold values corresponding to the leaf node to be deleted. Outside the TSX transaction, the next-pointer (such as next-pointer 444 depicted in FIG. 4B) of a neighboring that had previously pointed to the leaf to be deleted, may be modified so its next-pointer now points to the next leaf, i.e., the leaf on the other side of the leaf to be deleted. The processor may then deallocate the leaf to be deleted.

As may be appreciated in the art, the size of the nodes may affect the performance on B-Tree insertions and look-ups, under different latencies. Various example, non-limiting embodiments, shall now be discussed.

In an embodiment, an advantageous leaf size may not be related to the SCM latency, and may be around 32 KV pairs. Due to a hardware pre-fetcher, around 8 cache lines, 32 KV pairs=8 cache lines. For the inner nodes, sizes around 4K KVs prove to have desirable results. If a smaller size is used, performance may drop because pre-fetching may not be utilized at its full extent. If a larger size is used, then when a leaf splits, the keys greater than the split key in the parent node need to be moved to the right. Thus, the memory copy cost grows linearly with the node size, and becomes a significant cost during insertion with big inner node sizes.

As mentioned above, lookups may be performed in two phases: the inner node traversal and the lookup in the leaf. In some embodiments, the relationship between the execution and the inner node size may be negligible. However, in some embodiments the relationship between the inner node size may largely affect execution. For example, execution may be affected in embodiments that implement small leaf sizes having small inner nodes, where the depth of the tree tends to grow fast.

Smaller leaves may generally allow for a faster lookup of the keys, while bigger leaves may cause the linear lookup to slow down. Under a latency of 90 ns for both DRAM and SCM, the time spent in inner nodes may no longer be negligible, as the time generally grows as the depth of the tree grows (i.e., with small leaf sizes and small inner sizes).

In embodiments where fingerprinting methods are employed, the size of the leaf nodes are indirectly fixed by the size of the fingerprints. For example, if size of a fingerprint is 1 byte, meaning 56 fingerprints may fit within the first cache line, with the cache line already containing the bitmap, the leaf size is set to 56. In additional embodiments, where more or fewer than 56 fingerprints fit within the first cache line, the leaf size may be dictated accordingly.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for indexing data structures in memory, comprising:
   traversing a first node to find a location of a second node corresponding to a search key,
      wherein the first node is an inner node of a tree data structure and
      wherein the second node is located within a local persistent memory comprising a byte addressable storage class memory;
   calculating a hash value for the search key;
   comparing the calculated hash value with at least one fingerprint value stored in the second node, wherein the fingerprint value is determined by hashing a stored key;
   accessing at least one key-value pair having a matching hash value determined by the comparing; and
   returning a value associated with the matching key-value pair;
      wherein at least one of the traversing, calculating, comparing, accessing, and returning are performed by one or more computers.

2. The method of claim 1, wherein at least the first node is located within a volatile memory.

3. The method of claim 1, wherein the fingerprint value is determined by hashing the stored key using a modulo operation.

4. The method of claim 1, wherein the second node further comprises a bitmap indicating whether an associated node slot is empty.

5. The method of claim 4, further comprising:
   scanning the bitmap to find a first empty slot in the second node;
   writing a key-value pair to the first empty slot in the second node, wherein the key-value pair comprises a key and a value; and updating the bitmap, indicating the first empty slot is no longer empty.

6. The method of claim 5, further comprising:
calculating a hash value for the key of the written key-value pair; and
updating the fingerprint value associated with the stored key and its corresponding slot.

7. The method of claim 4, further comprising: allocating a third node when the bitmap indicates that there are no empty slots within the second node.

8. A system, comprising:
a memory; and
at least one processor coupled to the memory and configured to:
traverse a first node of memory to find a location of a second node of memory corresponding to a search key,
wherein the first node is an inner node of a tree data structure and
wherein the second node is located within a local persistent memory comprising a byte addressable storage class memory;
calculate a hash value for the search key;
compare the calculated hash value with at least one fingerprint value stored in the second node of memory, wherein the fingerprint value is determined by hashing a stored key;
accessing at least one key-value pair having a matching hash value determined by the comparing; and
returning a value associated with the matching key-value pair.

9. The system of claim 8, the memory comprising volatile memory and persistent memory.

10. The system of claim 9, the fingerprint value is determined by hashing the stored key using a modulo operation.

11. The system of claim 9, wherein the persistent memory comprises a tree data structure.

12. The system of claim 11, wherein the second node is a leaf node.

13. The system of claim 8, the second node further comprises a bitmap indicating whether an associated node slot is empty.

14. The system of claim 13, the at least one processor further configured to:
scan the bitmap of the second node to find a first empty slot in the node;
write a key-value pair to the first empty slot in the second node, wherein the key-value pair comprises a key and a value; and
update the bitmap of the second node, to indicate the first empty slot is no longer empty.

15. The system of claim 14, the at least one processor further configured to:
calculate a hash value for the key of the written key-value pair; and
update the fingerprint value associated with the stored key and its corresponding slot.

16. The system of claim 8, the at least one processor further configured to:
allocate a third node when the bitmap indicates that there are no empty slots within the second node.

17. A tangible computer-readable device having instructions stored thereon that, when executed by at least one computing device, causes the at least one computing device to perform operations comprising:
traversing a first node to find a location of a second node corresponding to a search key,
wherein the first node is an inner node of a tree data structure and
wherein the second node is located within a local persistent memory comprising a byte addressable storage class memory;
calculating a hash value for the search key;
comparing the calculated hash value with at least one fingerprint value stored in the second node;
accessing at least one key-value pair having a matching hash value; and
returning a value associated with the matching key-value pair.

18. The computer-readable device of claim 17, wherein the second node further comprises a bitmap indicating whether an associated node slot is empty.

19. The computer-readable device of claim 17, wherein at least the second node is located within a persistent memory.

20. The computer-readable device of claim 17, the operations further comprising:
scanning a bitmap of the second node to find a first empty slot in the second node;
writing a key-value pair to the first empty slot in the second node; and
updating the bitmap, indicating the first empty slot is no longer empty.

* * * * *